(No Model.)

J. W. BAUMGARDNER.
REGISTER FOR HARVESTING MACHINES.

No. 442,709. Patented Dec. 16, 1890.

Witnesses
J. J. Price
W. M. Ragon

Inventor
John W. Baumgardner

UNITED STATES PATENT OFFICE.

JOHN W. BAUMGARDNER, OF COLCHESTER, ILLINOIS.

REGISTER FOR HARVESTING-MACHINES.

SPECIFICATION forming part of Letters Patent No. 442,709, dated December 16, 1890.

Application filed June 14, 1890. Serial No. 355,409. (No model.)

*To all whom it may concern:*

Be it known that I, JOHN W. BAUMGARDNER, of Colchester, in the county of McDonough and State of Illinois, have invented a new and useful Harvesting-Machine Indicator, of which the following description will enable others skilled in the art to make and use the same, reference being had to the accompanying drawings, and to the letters of reference marked thereon, making a part of this specification.

The object of this invention is to supply a long-felt want in harvesting-machines—namely, an indicator that will register the number of miles traveled and the number of acres of grain cut each day; and its novelty will be fully set forth in the following description, and pointed out in the claim.

Figure 1:
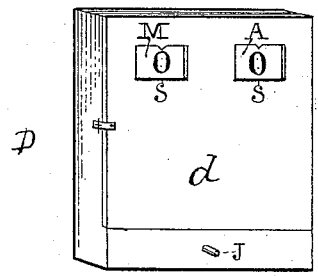
Figure 2:
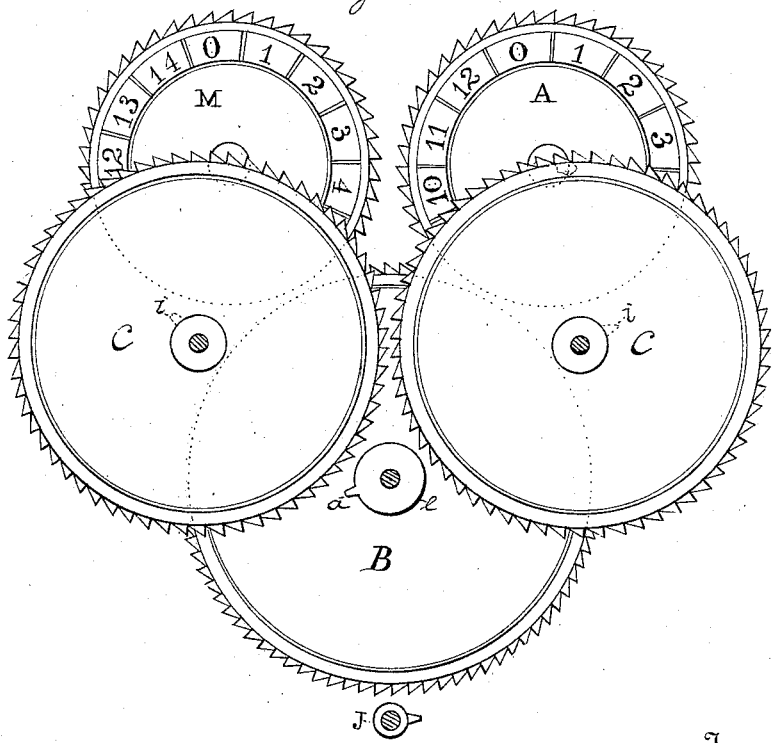

In the drawings, Figure 1 is a perspective view of the indicator detached from the harvester. Fig. 2 is an elevation showing the mechanism on the inside of Fig. 1.

Similar letters in each figure represent like parts, of which—

B represents the main drive-wheel of the indicator, and is provided with teeth around its periphery shaped similar to saw-teeth. The intermediate wheels $c\ c$ and the dial-wheels M and A all have similar teeth. (See Fig. 2.) All the aforesaid wheels are mounted on suitable shafts, which are placed in a suitable frame, that fits into the indicator-box D, the upper edge of the dial-wheels M and A being placed opposite the windows $s\ s$, so that the numerals can be plainly seen by the operator. Each of these wheels is provided with a yielding spring-backing, (not shown,) which is to produce sufficient inertia to hold each wheel in its proper position and keep it from moving only when it is moved by another. The wheel B receives its motion from an extension of the side driver-shaft or some other suitable shaft in the harvesting-machine represented at J. (See Fig. 1.) The shaft extends into the indicator-box, and is provided with a small wheel having one cog, which at every revolution catches into a tooth and turns the wheel B the distance of one tooth, and at each revolution of the wheel B the cog $a$ on the hub $e$ catches into a tooth on each of the intermediate wheels $c\ c$ and turns each of them the length of one tooth. The cog $i\ i$ on the inner side of the wheels $c\ c$ (shown in dotted lines, Fig. 2) at each revolution catches into the teeth of the respective dial-wheels M and A and turns each the length of one tooth. The numerals on the dial-wheel M indicate the number of miles traveled, and the numerals on the dial-wheel A indicate the number of acres harvested during the day.

Each of the aforesaid wheels by calculation has the required number of teeth cut in its periphery to produce the required results in each of the dial-wheels M and A. The said calculation is based on the width the harvester cuts and the number of revolutions the shaft to which the indicator is attached makes while the harvester travels the length of one rod of ground. The operator before starting the harvester opens the door $d$ of the indicator and turns each of the dial-wheels until "0" is opposite their respective windows $s\ s$. (See Fig. 1.)

The dial-wheel M represents miles, and the dial-wheel A represents acres.

The utility of this invention is very obvious, as the operator can by looking at the mile-register tell when it is time to stop and oil the machinery, and at the end of the day's work the acre-register gives the exact number of acres harvested that day.

Having thus described my invention, what I claim, and desire to obtain by Letters Patent, is—

A harvesting-machine indicator consisting of the main wheel B, having cog $a$ on its hub $e$, two intermediate wheels $c\ c$, having cogs $i$ on their respective hubs, two dial-wheels M and A, each containing numerals on its face side, all of said wheels having teeth similar to saw-teeth around their respective peripheries, all said wheels mounted on shafts and placed in such a manner that they all receive motion from the driving-shaft J, in combination with a suitable box or case having windows $s\ s$, substantially as shown and described, for the purpose set forth.

JOHN W. BAUMGARDNER.

Witnesses:
T. J. PRICE,
W. M. RAGON.